United States Patent
Beck et al.

(10) Patent No.: US 6,826,432 B2
(45) Date of Patent: Nov. 30, 2004

(54) PROCESS FOR PROGRAMMING AN AUTOMATION APPLICATION

(75) Inventors: François Beck, Chateuneuf de Grasse (FR); Henry Baraston, Nice (FR); Christian Laurain, Roquefort les Pins (FR)

(73) Assignee: Schneider Automation (FR)

(*) Notice: Subject to any disclaimer, the term of this patent is extended or adjusted under 35 U.S.C. 154(b) by 416 days.

(21) Appl. No.: 10/054,980

(22) Filed: Jan. 25, 2002

(65) Prior Publication Data

US 2002/0147505 A1 Oct. 10, 2002

(30) Foreign Application Priority Data

Jan. 26, 2001 (FR) .............................. 01 01122

(51) Int. Cl.[7] .............................. G05B 11/01
(52) U.S. Cl. .............. 700/18; 700/86; 700/87; 700/88; 700/89; 700/181; 700/253; 717/103; 717/104; 717/126; 717/127; 901/3; 901/4; 901/5
(58) Field of Search .................. 700/17, 18, 83, 700/86, 87, 88–89, 181, 253, 131; 717/109, 104, 108, 126–127; 901/3, 4, 5

(56) References Cited

U.S. PATENT DOCUMENTS

| | | | | |
|---|---|---|---|---|
| 5,579,309 A | * | 11/1996 | Totzke ..................... | 370/385 |
| 5,923,903 A | * | 7/1999 | Alvarez-Escurra et al. ... | 710/62 |
| 5,980,078 A | * | 11/1999 | Krivoshein et al. ............ | 700/1 |
| 6,345,351 B1 | * | 2/2002 | Holmberg .................. | 711/203 |
| 6,453,460 B1 | * | 9/2002 | Keyes ......................... | 717/108 |
| 6,473,824 B1 | * | 10/2002 | Kreissig et al. .......... | 348/222.1 |
| 6,694,199 B1 | * | 2/2004 | Yamada et al. ............... | 700/86 |
| 2003/0095514 A1 | * | 5/2003 | Sabe et al. ................... | 370/328 |

FOREIGN PATENT DOCUMENTS

EP 0 752 646 1/1997

OTHER PUBLICATIONS

Herter, T., et al. "Eine Sprache zur Generierung von Geratetreibern." Angewandte Informatik. Applied Informatics, Vieweg und Sohn Verlag GMBH, Braunschweig, DE. vol. 29, No. 8/9. Sep. 1, 1987, pp. 369–378. (English abstract).

"Device–Independent Support in Communication Environments." IBM Technical Disclosure Bulletin, IBM Corp., New York, U.S. vol. 33, No. 2. Jul. 1, 1990. pp. 99–100 (p. 369, right column, line 1 to p. 370, right column, line 16).

* cited by examiner

*Primary Examiner*—Ramesh Patel
(74) *Attorney, Agent, or Firm*—Parkhurst & Wendel, L.L.P.

(57) ABSTRACT

A process for programming an automation application program on an automation equipment programming station, including defining several structured type objects each representing an input-output channel of automation equipment, declaring symbolic input-output variables of the program as an instance of a previously defined structured type object, a configuring symbolic input-output variables comprising a definition of the physical location of inputs-outputs of the automation equipment, automatically interpreting the program to execute it on the automation equipment, comprising replacing symbolic variables in the program with the complete topological address of corresponding input-output information.

9 Claims, 3 Drawing Sheets

| VARIABLE NAME | | TYPE | ADDRESS |
|---|---|---|---|
| TANK1 | | T_ANA_IN_STD | % CH.1.2.3. |
| | CH_ERROR | BOOL | % I.1.2.3.ERR |
| | VALUE | INT | % IW.1.2.3. |
| | CH_FLT | WORD | % MW.1.2.3.2 |
| | APPI_FLT | BOOL | % MW.1.2.3.2 |
| | EXCH_STS | WORD | % MW.1.2.3.0 |
| | EXCH_RPT | WORD | % MW.1.2.3.1 |
| | CH_CMD | WORD | % MW.1.2.3.3 |
| TANK2 | | T_ANA_IN_STD | % CH.1.3.1. |
| | CH_ERROR | BOOL | % I.1.3.1.ERR |
| | VALUE | INT | % IW.1.3.1 |
| | CH_FLT | WORD | % MW.1.3.1.2 |
| | APPI_FLT | BOOL | % MW.1.3.1.2 |
| | EXCH_STS | WORD | % MW.1.3.1.0 |
| | EXCH_RPT | WORD | % MW.1.3.1.1 |
| | CH_CMD | WORD | % MW.1.3.1.3 |

PROCESS FOR PROGRAMMING AN AUTOMATION APPLICATION

FIELD OF THE INVENTION

This invention relates to a process for programming an automation application on an automation equipment programming station. It also relates to such a programming station.

BACKGROUND OF THE INVENTION

A programming station means computer equipment, particularly a PC type computer that may or may not be connected to the automation equipment to be programmed, and comprising a central processing unit and a program commonly called a programming workshop with which a user interacts to design and generate an automation application program that will be executed on one or several items of automation equipment.

Automation equipment as referred to herein denotes a programmable logic controller, a numerical control or any equipment that may contain and execute an application program controlling an automation application, this automation application for example being in the domain of industrial process automation, building automation or monitoring/control of electrical distribution networks.

This type of automation equipment is composed of a central processing unit (CPU) and at least one input-output coupler connected to sensors and preactuators in the automation application to be controlled. The central processing unit comprises one or more processors, a ROM type memory that is usually not modifiable, or an EEPROM type modifiable memory containing the manufacturer's program also called the operating system expressed in the manufacturer's specific language, a RAM memory, and an input-output manager communicating together using a bus. A first area of the RAM memory, also called the volatile memory, contains the user's program, and a second area contains the data, and particularly images of coupler states and constants related to the user's program.

The user's program, also called the application program, checks or controls an automation application by means of inputs-outputs controlled by this application program. The designer creates this program and it is written in one or several graphic automation languages particularly including Ladder Diagrams, Sequential Function Charts, also called Grafcets, Function Block Descriptions or instruction lists. These automation languages are preferably conform with standard IEC1131-3 to facilitate programming by an automation designer who is not necessarily familiar with computer languages. These languages can be used either on a programming station or on an automation equipment.

At the moment, the method of programming an application program developed on a programming station using one or several of the available languages, particularly graphic languages, and defining variables associated with the automation, comprises firstly a "configuration" step in which the designer precisely determines the complete topological address of each channel and input-output objects used in the application program. This long and tedious operation obliges the designer firstly to manipulate the technical documentation for the different input-output modules of the automation equipment supporting the different channels, and secondly to know the position of each module in the rack(s) of the automation equipment, and thirdly to manipulate the direct topological syntax of the variables associated with the input-output channels of the automation equipment, in the application program.

This programming method also has the disadvantage that it is completely dependent on the physical location of the modules. Thus, since the programming station cannot manipulate symbolic variables representing an input-output channel structure, when the same automation application has to be made for the same type of automation equipment but with a completely different physical location of the input-output modules, the designer of the application program needs to use a different configuration procedure to adapt the implementation of the same application program for the new physical location.

SUMMARY OF THE INVENTION

Therefore, the purpose of this invention is to overcome the disadvantages of prior art by proposing a process for programming an automation application capable of manipulating data exchanged between an application program and channels of input-output modules in a symbolic and structured form, and consequently enable the application program to be written before a configuration step, and independently of the automation equipment.

This purpose is achieved by a process for programming an automation application program on an automation equipment programming station that comprises:

a step to define a plurality of structured type objects each representing an input-output channel of an input-output module of the automation equipment, the definition of each structured type including at least one characteristic element corresponding to input-output information exchanged between the input-output module and the application program, and the relative topological address of the input-output information for each element, a step to write an automation application program, declaring symbolic input-output variables of the application program as an instance of a previously defined structured type object, a step to configure symbolic input-output variables comprising a definition of the physical location of each input-output module of the automation equipment associated with the symbolic input-output variables of the application program, a step to automatically interpret the application program to execute it on the automation equipment, comprising a step to replace symbolic input-output variables in the application program by the complete topological address of the corresponding input-output information.

According to another feature, each symbolic variable of the program comprises two fields, a first field composed of a character string chosen by the application program designer, so that a structured type object can be made to correspond with the symbolic variable, and a second field composed of an identification of an element of the structured type object associated with the symbolic variable.

According to another feature, the replacement step comprises:

a step to search for the relative address defined for each structured type element in a table of elements of a structured type object stored on the programming station, a step to search in a configuration table for the physical location declared for each module that the designer has associated with symbolic input-output variables of the application program, a step to construct the exact topological address of each symbolic variable of the application program, using interpretation means on the programming station, starting from the relative address and the physical location found.

According to another feature, the step to define structured type objects comprises a step to create a table of structured type object elements comprising a first column containing at least one identification of a characteristic data of the structured type object, a second column containing the elementary data type (EDT) and a third column containing the relative address of the data, and then memorizing this table on portable memory means, for each structured type object.

According to another feature, the table of structured type object elements comprises a fourth column containing a description of the data, and a fifth column containing read or write rights for each data.

According to another feature, the process comprises a step to configure input-output modules comprising a step to select a commercial reference of an input-output module, and assignment of the selected input-output module to a determined physical location, the interpretation step then including a step to check that the input-output module selected at a determined physical location is compatible with the structured type object configured at the same physical location.

A second purpose of the invention is to propose a station for programming an automation application on an automation equipment to manipulate data exchanged between an application program and channels of input-output modules in a symbolic and structured form, and consequently to enable writing the application program before a configuration step, independently of the automation equipment.

This second purpose is achieved by a station for programming an automation equipment comprising means of memorization and display, and means of interaction with an application program designer, characterized in that the programming station comprises a symbolic variables editor to generate a configuration table stored on the memory means, the programming station also includes a plurality of tables of structured type object elements stored on the memory means, and means of interpreting an application program comprising at least one symbolic variable defined by the designer using the editor.

According to another feature, the programming station comprises means of compiling the application program interpreted by interpretation means to transform the interpreted application program into an automation application that can be executed on an automation equipment, the programming station comprising means of transferring the executable automation application onto either portable memory means compatible with the automation equipment, or directly onto the memory means of the automation equipment.

BRIEF DESCRIPTION OF THE DRAWINGS

The invention and its characteristics and advantages will be more clearly understood after reading the description with reference to the attached drawings in which.

DESCRIPTION OF THE EMBODIMENTS

As explained above, the principle of the invention is to enable programming, in other words writing the application program (10) controlling an automation application, without knowing the direct and complete topological syntax of each input-output variable used in the application program (10). In order to achieve this purpose, the process according to the invention provides a number of tools for use by the automation application program designer. With these tools, the designer can use symbolic and structured objects or variables representing data exchanged between the different channels of the different input-output modules used in the automation application and the application program (10), in the syntax of the application program controlling the automation application.

The application program for an automation equipment is broken down into tasks. A task is a set of instructions periodically executed by the processor in the automation equipment central processing unit. The manufacturer's program activates the input-output manager before executing a task to acquire information from a logical channel. At the end of the task, the manufacturer's program activates the input-output manager so that it sends information to the logical channel.

A data structure for automation equipment is associated with each logical channel of a given coupler that we will call the language interface. The data structure depends on the coupler and the logical channel. The size and contents will depend on the business function to be performed. It is stored in an area of the coupler memory, the contents of this memory being exchanged (received or sent) on or to an identical memory area in the memory of the central processing unit of the automation equipment.

The data structure is structured by exchange type:

periodic input exchange: the contents are sent from the coupler memory to the memory of the central processing unit, this memory area usually contains information produced periodically, for example the numeric value of a sensor;

periodic output exchange: the contents are received from the memory of the central processing unit, this memory area usually contains information sent periodically by the user's program;

exchange at the request of the user's program: this area contains parts for which the contents are received from the memory of the central processing unit and parts for which the contents are sent to the memory of the central processing unit, and contains information processed "non-periodically" by the user's program;

configuration exchange when the user's program is started: this area is received from the memory of the central processing unit, this memory area contains information defined by the user to start the business function.

The areas are denoted I, Q, M, K respectively.

The user's program accesses information stored in the following areas of the memory of the central processing unit in the form of the data structure using the syntax defined above.

If a logical channel is considered, for example 0 or 1, area 1 contains information generated by this logical channel.

Area Q contains orders or commands of the central processing unit that will be sent to the logical channel.

Area M depends on the business function and may contain "status" type information, specific command parameters, adjustment parameters. All this information is exchanged at the request of the user's program.

The status parameters contain channel faults and possibly the operating state of the logical channel.

Specific command parameters are commands that can be distinguished from the area only because they are sent at the request of the user's program, for example such as an order to move to a position and a given speed.

Adjustment parameters consist of information transmitted to the logical channel to describe variable characteristics of the operation part. For example, one of the parameters for an axis control coupler is the process position gain.

Area K contains configuration parameters, in other words parameters of sensors or actuators working with the coupler. These are invariables for a given operation part.

The different areas I, Q, M and K, in turn, are structured into memory sub-areas defining the type of information contained in the area. These sub-areas are as follows:

the "Bits" sub-area, coded X, or by default (if no object type is specified); the type of the stored information is binary, for example to start counting, the "Words" sub-area, coded W: the type of the stored information is numeric and is coded on 16 bits, for example the numeric value of a temperature sensor;

the "Double words" sub-area coded D: the type of the stored information is numeric and is coded on 32 bits, for example the numeric value of a temperature sensor;

the "Floating points" sub-area coded F: the type of the stored information is single precision real coded on 32 bits (IEC 559), for example the numeric value of a temperature sensor.

Each sub-area contains several items of information or elements of the same type. A given element is defined by its "rank", the value of the rank being equal to the position of the element with respect to the beginning of the sub-area. Therefore each information element is defined by an information type (X, W, D, F) and a rank within each area.

The syntax of the language interface is in the form %<exchange type code> <information type code> <topological address> <.rank>, for example %IW0.1.3.2.

The topological address is defined by the coupler address associated with the logical channel number. Couplers installed in the main rack are accessed by an address equal to the rack number (address 0) followed by the coupler number defined on one or two digits. For example, address 0.1.0 is the logical channel 0 of the coupler located in slot 1 in the main rack, with slot number 0 as the default. 0.%ID0.1.0 will be the value of logical counting channel 0 for the 32-bit counter in slot 1 in the main rack.

Figure 1:
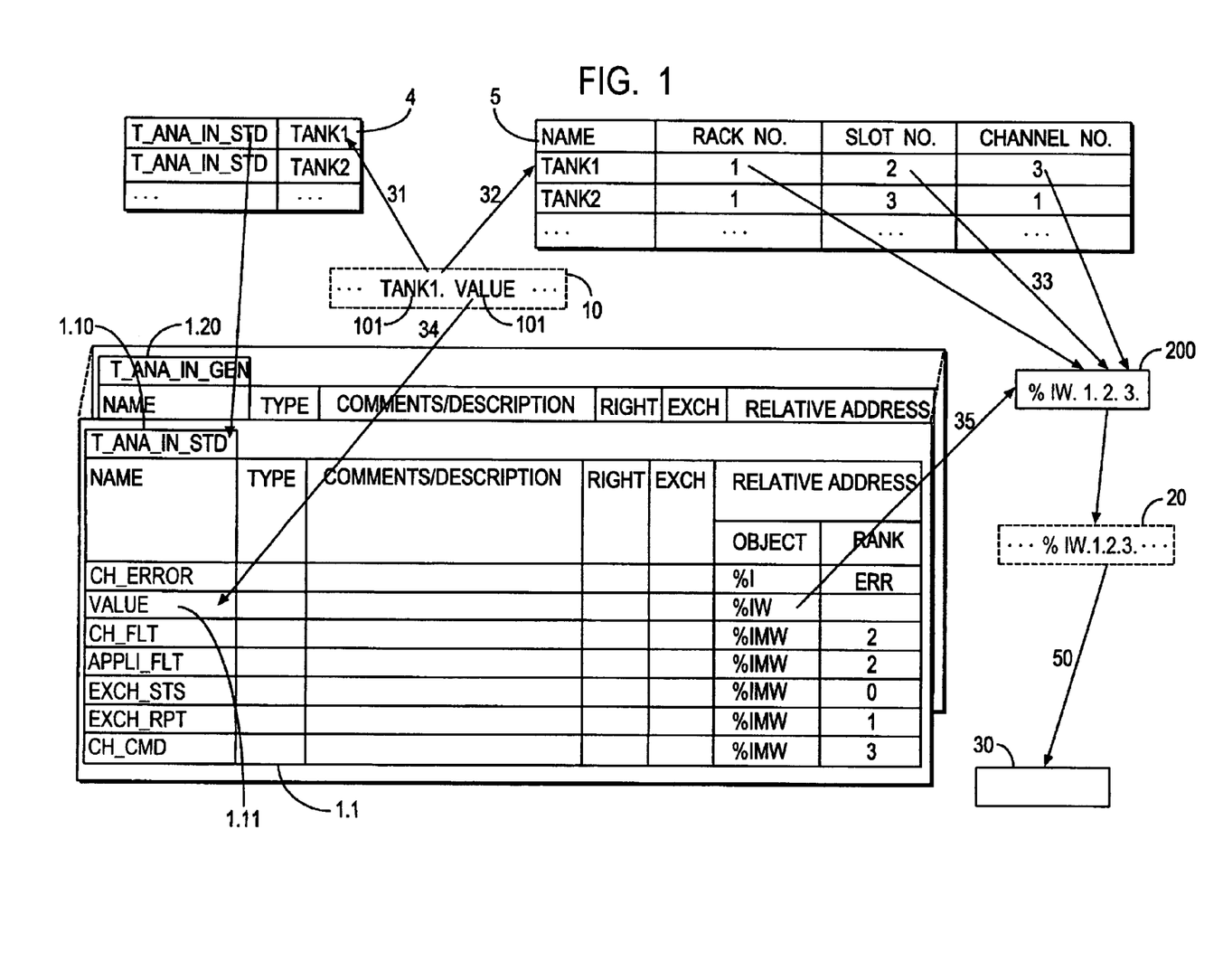
FIG. 1 represents an operating scheme of the process according to the invention.
Figure 2:
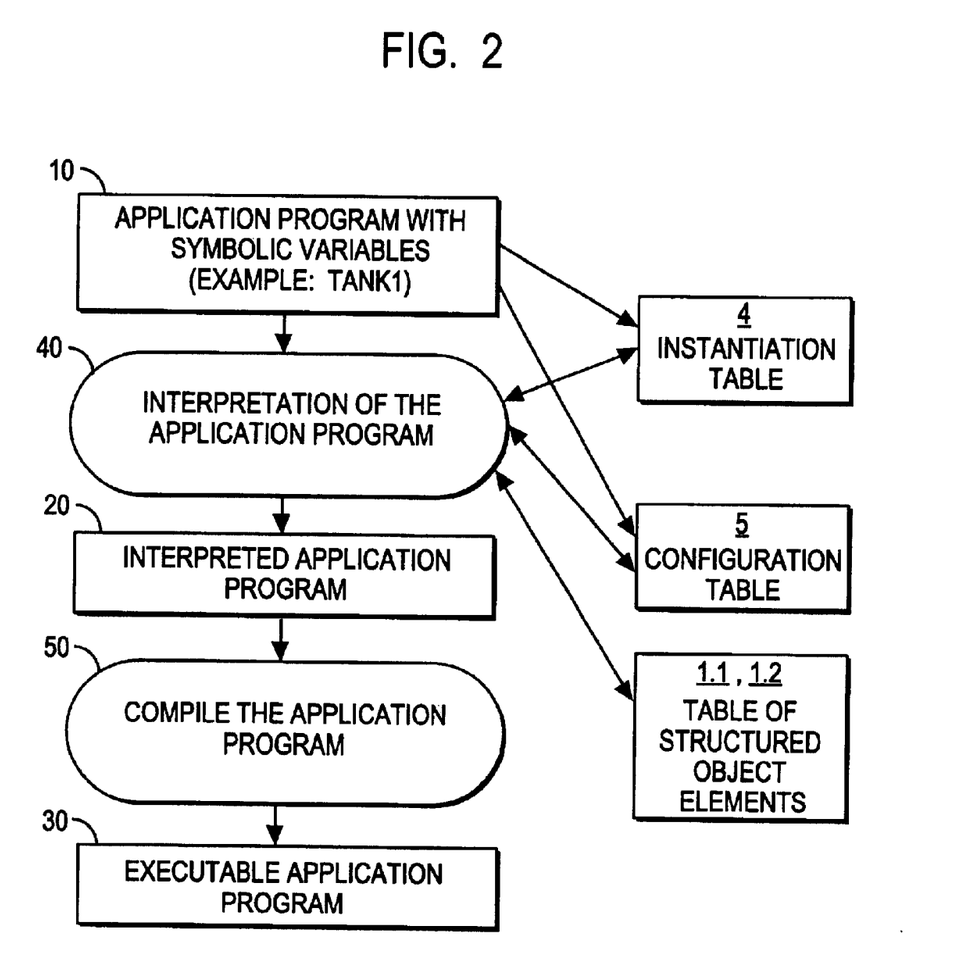
FIG. 2 represents an operating diagram of the process according to the invention.

We will now describe the process according to the invention with reference to FIGS. 1 and 2.

The first tool comprises a symbolic description of each channel of the different input-output modules, for example in the form of a table (1.1, 1.2) stored on the memory means of the programming station. For each input-output channel, this description includes a structured type input-output objects file referred to as structured type objects or IODDT (Input/Output Derived Data Type) indifferently throughout the rest of this description. Each structured type objects file is identified by a name (1.10, 1.20) composed of a string, for example containing not more than 32 characters. Each structured type object (for example T_ANA_IN_GEN) is defined uniquely to form an identifier of a channel or an input-output module.

For example, the structured type object named "T_ANA_IN_STD" is defined for an analogue input of an input-output module. If this same input-output module includes, for example, an on-off input and various outputs, a different structured type object will be defined for each input and for each output of the input-output module.

A comment can be associated with a structured type object so that the user of the process according to the invention can make the relation between the structured type and the output or the input of the module or the corresponding input-output channel.

According to one variant embodiment, a key can be added to each structured type object, to identify a family or class to which the structured type object belongs. A family means a set of structured type objects denoting modules or input-output channels performing the same type of business function. For example, a first key (DIS) is used to identify structured type objects of modules or On-Off input-output channels ("TOR" or "DIS" for discrete). A second key (ANA) is used to identify structured type objects of modules or input-output channels performing analogue functions ("ANA"). A third key (COM) is used to identify structured type objects of modules or input-output channels of communication functions ("COM"). A fourth key (COUNT) is used to identify structured type objects of modules or input-output channels of count functions ("COUNT"). A fifth key is used to identify structured type objects of modules or input-output channels of movement functions ("AXIS" or "CSY" or "STEPPER" or "INTERPO"). Other keys may be defined for other business functions, particularly such as weighing functions. Due to these keys, structured type objects can be classified in the table by business function, in order to facilitate their manipulation by the designer of the automation application.

The following family table comprises a non-exhaustive list of different structured type objects grouped by family, giving the family name to which an IODDT structured type object belongs in a first column, the name of the IODDT in a second column, and a brief description of the IODDT in a third column.

| I/O family | IODDT name | IODDT description |
|---|---|---|
| On-Off | T_DIS_IN_GEN | Generic On-Off input |
|  | T_DIS_IN_STD | Standard On-Off input |
|  | T_DIS_EVT | Event related On-Off input |
|  | T_DIS_IN_MOM | Standard On-Off input of a determined "Momentum" module |
|  | T_DIS_OUT_GEN | Generic On-Off output |
|  | T_DIS_OUT_STD | Standard On-Off output |
|  | T_DIS_OUT_REFLEX | Reflex On-Off output |
|  | T_DIS_OUT_MOM | Standard On-Off output of a determined "Momentum" module |
| Analogue | T_ANA_IN_GEN | Generic analogue input |
|  | T_ANA_IN_STD | Standard analogue input |
|  | T_ANA_IN_CTRL | Standard analogue input + measurement status |
|  | T_ANA_IN_EVT | Fast analogue input + event |
|  | T_ANA_OUT_GEN | Generic analogue output |

-continued

| I/O family | IODDT name | IODDT description |
|---|---|---|
| | T_ANA_OUT_STD | Standard analogue output |
| | T_ANA_IN_MOM8 | Analogue input of a determined "Momentum ANA 4/8 IN" module |
| | T_ANA_IN_MOM16 | Analogue input of a determined "Momentum ANA 16 IN" module |
| | T_ANA_OUT_MOM_8 | Analogue input of a determined "Momentum ANA 8 OUT" module |
| | T_ANA_DIS_IN_OUT_MOM12 | Analogue input-output of a determined "Momentum ANA + DIS 4I/2O" module |
| Communication | T_COM_STS_GEN | Generic COM channel with status |
| | T_COM_UTW_M | Master "Unitelway" |
| | T_COM_TTW_S | Slave "Unitelway" |
| | T_COM_MB | "Modbus" |
| | T_COM_CHAR | Character mode |
| | T_COM_FPW | "Fipway" |
| | T_COM_MBP | "Modbus" Plus |
| | T_COM_JNET | "JNET" |
| | T_COM_ASI | "AS-i" |
| | T_COM_ETY_1X0 | Ethernet 110 and 120 |
| | T_COM_ETY_210 | Ethernet 210 |
| | T_COM_IBS | InterBus |
| Count | T_COUNT_ACQ | Counter in acquisition mode |
| | T_COUNT_HIGH_SPEED | High speed counter |
| | T_COUNT_STD | Standard counter |
| Movement | T_AXIS_AUTO | Axis in automatic mode |
| | T_AXIS_STD | Standard axis |
| | T_INTERPO_STD | Standard interpolation |
| | T_STEPPER_STD | Stepping motor |
| | T_CSY_SCM | Movement module with Sercos digital link (registered trademark) |
| | T_SCY_RING | Sercos ring (registered trademark) |
| | T_CSY_IND | Real, imaginary or remote independent axis |
| | T_CSY_FOLLOW | Servocontrolled axis |
| | T_CSY_COORD | Coordinated axis |
| | T_CSY_CAM | Cam |

Each IODDT structured type object comprises a data structure comprising at least one element (1.11) or characteristic attribute. All elements or attributes of a structured type object form a data structure for the structured type object considered. Each element or attribute of the structured type object corresponds to input or output information from the module or input-output channel corresponding to the structured type object to which the element belongs.

According to another aspect of the invention, there can be relations between the different IODDT objects in the same family. These relations are represented by the inheritance of the elements of one IODDT by another IODDT. An analogy can be made between this invention and conventional object oriented programming in computer applications. Due to its definition and its structure, a structured type object can be compared with an object class in object oriented language. In the same way as for an object oriented language, a sub-class inherits the attributes and methods of one or more of the classes on which it depends, and an IODDT object also inherits the elements of the IODDT object on which it depends.

For example, the T_DIS_IN_GEN IODDT corresponding to a standard On-Off input is a sub-set of the T_DIS_IN_STD IODDT corresponding to a generic On-Off input. Consequently, all the attributes of the T_DIS_IN_STD IODDT are inherited from the T_DIS_IN_GEN IODDT.

According to the invention, all elements of a given structured type object (T_ANA_IN_STD, T_ANA_IN_GEN) can be grouped in a table (1.1 or 1.2) specific to each object.

The object table No. 1 (1.1.) below contains elements of the "T_ANA_IN_STD" structured type object defined above and corresponding to a standard analogue input of an input-output module.

TABLE 1

| Name | Type | Comments/Description | Right | Exch | Relative address Object | Rank |
|---|---|---|---|---|---|---|
| CH_ERROR | BOOL | Channel error | R | IMP | % I | ERR |
| VALUE | INT | Value of the analogue output | R | IMP | % IW | |
| CH_FLT | WORD | Channel fault | R | STS | % MW | 2 |
| APPLI_FLT | BOOL | Limiting value | R | STS | % MW | 2 |
| EXCH_STS | WORD | Exchange status word | R | SYS | % MW | 0 |
| EXCH_RPT | WORD | Exchange report | R | SYS | % MW | 1 |
| CH_CMD | WORD | Channel command | R/W | CMD | % MW | 3 |

Each object table comprises a first column that defines the name of the element that also forms the identifier of the element of the structured type object. For example, this identifier may be mnemonic, such that the designer of the automation application can quickly identify the input-output object corresponding to the element of the structured type object. Thus, CH_ERROR denotes a channel error; EXCH_STS denotes an exchange status word; CH_FLT denotes a channel fault; CH_CMD denotes a channel command; and EXCH_RPT denotes an exchange report.

A second column in the object table contains the element type, in other words the type of the data or information corresponding to the object. The element type is used with a second table in which a third column contains the interval at which the values of the element can vary. According to the invention, the element type is one of the Elementary Data Types (EDT)known and used in the automation field.

TABLE NO. 2 below summarizes the different EDTs:

| Element type | Topological object | value interval |
|---|---|---|
| EBOOL | % I - % Q | 0 (FALSE) - 1 (TRUE) |
| BOOL | % I @ mod. ERR - bits extracted from words | 0 (FALSE) - 1 (TRUE) |
| INT | % IW - % QW - % MW - % KW | [−32768, 32767] |

TABLE NO. 2-continued below summarizes the different EDTs:

| Element type | Topological object | value interval |
|---|---|---|
| DINT | % ID - % QD - % MD - % KD | [−2147483648, 2147483647] |
| UINT | % IW - % QW - % MW - % KW | [0, 65535] |
| UDINT | % ID - % QD - % MD - % KD | [0, 4294967295] |
| WORD | % IW - % QW - % MW - % KW | [0, 65535] |
| DWORD | % ID - % QD - % MD - % KD | [0, 4294967295] |
| REAL | % IF - % QF - % MF - % KF | Real number |

EBOOL: boolean with front and forcing
BOOL: boolean
INT: integer number
DINT: double integer number (D for double)
UINT: unsigned integer number (U for unsigned)
UDINT: unsigned double integer number
WORD: binary word
DWORD: double binary word
REAL: real number The second column in table No. 2 of elementary data types defines the list of topological objects compatible with each corresponding elementary data type, for each type of element.

A third column in table No. 1 of the elements of a structured type object comprises a comment or description (desc) defining the function and/or contents of the element.

A fourth column in table No. 1 of the elements of a structured type object defines the possible access type (Right) on this element. Access means either a simple read (R) of the element, or a read and write (R/W) of the element. According to the above table, the symbol R indicates that only read operations can be done on the element. The R/W symbol shows that the program can do read and write operations on the element.

Thus for example, elements assigned to a memory area corresponding to a periodic input exchange channel %I, %IW or to a memory area of a configuration exchange channel %KW are accessible in read only, whereas elements assigned to a memory area of a periodic output exchange channel %Q or %QW are accessible in read and in write. For elements assigned to a memory area of an exchange channel at the request of the user's program %MW, access rights depend on the element type. Assigned means that a physical element of input/output modules is assigned to the logical element defined by the type.

A fifth column in table No. 1 containing the elements of a structured type object comprises characterization (EXCH) of the manner in which data is transmitted between the module and the application program. For example, this exchange may be one of six different types. Each type of exchange is identified uniquely.

IMP means that the information is exchanged implicitly,

STS means that the information is exchanged by a specific read command (READ_STS), CMD means that the information is exchanged by a specific write command (WRITE_CMD), PRM means that the information is exchanged by a specific read, write, save or restore command (READ/WRITE/SAVE/RESTORE_PARAM), SYS means that the information is managed by the system only, in other words the central processing unit of the automation equipment, SPE means that the information is exchanged in a specific manner.

A sixth column in table No. 1 of the elements of a structured type object is used to make the relative mapping, by supplying the relative address in memory of the input-output object corresponding to the element of the structured type object. This address is supplied by the technical documentation of the manufacturer of the device containing the channel or the input-output module corresponding to the element of the structured type object. The name or syntax of the relative address written in the sixth column depends on the language interface chosen by the manufacturer to describe each input-output element.

In our example, the sixth column of table No. 1 of the elements of a structured type object is split into two sub-columns. A first sub-column (object) comprises a data type that characterizes the input-output object. A second sub-column (rank) contains the rank of the object.

For our example, table No. 3 below contains the language interface that can be provided by a manufacturer to describe the objects of an analogue input channel of an input-output module in the analogue family.

TABLE NO. 3

| Object | Rank | Bit | R/W | Name |
|---|---|---|---|---|
| % I | ERR | | R | Channel error |
| % IW | [0] | | R | Value of the analogue input |
| % MW | 0 | | R | Exchange status word |
| % MW | 1 | | R | Exchange report |
| % MW | 2 | | R | Channel fault |
| % MW | 2 | X2 | R | External fault: terminal block fault |
| % MW | 2 | X3 | R | External fault: electrical power supply |
| % MW | 2 | X4 | R | Internal fault: channel unusable |
| % MW | 2 | X5 | R | Software or hardware configuration fault |
| % MW | 2 | X6 | R | Communication bus fault |
| % MW | 2 | X7 | R | Limiting value |
| % MW | 2 | X8 | R | Channel not ready |
| % MW | 2 | X9 | R | Cold solder compensation error |
| % MW | 2 | X10 | R | Calibration fault |
| % MW | 2 | X14 | R | Low threshold exceeded |
| % MW | 2 | X15 | R | High threshold exceeded |
| % MW | 3 | | R/W | Command (forced calibration) |
| % MW | 4 | | R/W | Command (forced value) |
| % MW | 5 | | R/W | Command (threshold calibration) |
| % MW | 6 | | R/W | Command (source calibration) |
| % MW | 7 | | R/W | Adjustment (filtering coefficient) |
| % MW | 8 | | R/W | Adjustment (alignment offset) |
| % KW | [0] | | R | |
| % KW | 1 | | R | |
| % KW | 2 | | R | |

A similar language interface table is associated with each channel of each module in each family (TOR, COM, COUNT, etc.) and each of these tables is defined by the manufacturer.

The information contained in the first three columns in table No. 3 are particularly applicable to the relative address (object, rank, bit) of each input-output object of the analogue input. The information contained in the fourth column applies to read and write rights. The fourth and sixth columns in table No. 1 are defined by the IODDT designer and form part of the description of the IODDT stored in a catalogue on the programming station. Thus, the designer of an automation application does not modify the contents of these columns.

Thus, for example, the "VALUE" element of the structured type object "T_ANA_IN_STD" in table No. 1 of the elements of a structured type object is defined as being the value of the standard analogue input of an analogue input of an input-output module. According to the third row of the language interface table No. 3, the value of the analogue input is a %IW type word object in a memory area of a periodic exchange channel in a rank 0 input accessible in read only. Starting from this information taken from the technical documentation for the analogue input of the input-output module, the manufacturer fills in the "VALUE" line of table No. 1 by inputting the letter R in the fourth column using an appropriate graphic interface, to mean that the "VALUE" element of the "T_ANA_IN_STD" structured type object is accessible in write only. Similarly, the manufacturer defines the "VALUE" line in table No. 1 of elements of a structured type object, by inputting "%TW" in the sixth column to indicate the memory area and the memory size of the "VALUE" element of the "T_ANA_IN_STD" structured type object.

The relative topological address provided in the sixth column of table No. 1 of the elements of a structured type object does not enable the automation application to use input-output objects contained in the program. The information contained in the sixth column of table No. 1 of elements of a structured type object cannot be used to recreate the complete topological address of the input-output object. As explained in the preamble to the description, the main characteristic for programming automation equipment is that each element or variable used in an automation application program is stored in a precise memory area of the central processing unit in the automation equipment, this memory area being defined as a function of the physical location of the input-output modules. Thus, in our example, the physical location or the exact topology of the input-output module comprising an analogue input corresponding to the structured type "T_ANA_IN_STD" must be known, in order to completely define the address of each element in the memory area.

According to the invention, the sixth column in table No. 1 of the elements of a structured type object only provides information about the elementary type (EDT) of the object and the rank of this object.

By constructing each table No. 1 of elements of a structured type object for each structured type object, it is understandable that several structured type objects or IODDTs and their associated elements can be defined in advance for each channel of a determined input-output module, independently of the physical location of the input-output module in an automation equipment. Similarly, when two or several input-output modules, possibly of different types, comprise a channel performing the same business function, a single structured type or IODDT is defined for all the channels of modules performing the same business function.

In our example, the structured type object "T_ANA_IN_STD" is defined for a standard analogue input of a first module. If a second different module comprises a standard analogue input generating at least all the elements of the structured type object defined in table No. 1, then the same structured type "T_ANA_IN_STD" may be used when installing the application program for the second module. In our example, the only difference between the first and second module is in the topology of each module. However, as already explained, structured type objects are independent of their exact topology.

Tables No. 1 of the elements of a structured type object are created by the modules' manufacturer and provided to the application program designer, for example in the form of a file stored on portable memory means.

The application program designer then uses the structured type objects, in other words tables (1.1, 1.2) of elements of a structured type object each corresponding to a structured type object, to define all input-output variables that he would like to use. This definition actually consists of instantiating a structured type object defined in table No. 1 with an input-output variable (100) chosen by the application program designer. This declaration is made either at the beginning of the program, or in a fourth separate instantiation table No. 4 (4, FIG. 1).

This instantiation table No. 4 (4) is stored in memory means of the programming station, for example in the following form:

| | |
|---|---|
| Tank1 | T_ANA_IN_STD |
| Tank2 | T_ANA_IN_STD |

A first column comprises a character string chosen by the designer to identify a variable. A second column comprises the structured type object associated with this variable.

The fourth instantiation table may be built up using a graphic interface of the programming station, to edit all variables used in the program.

By declaring each variable (100) in this way, the designer also associates the data structure corresponding to a structured type object (1.10) stored in table No. 1, for each symbolic input-output variable (100). Thus, in our example, the designer will simply write "Tank1.VALUE" to denote the value of the analogue input of the tank 1 input-output variable.

Thus, it can be seen that when writing the application program (10), the designer no longer needs to know the exact physical location, in other words the topology or the configuration of the input-output modules. He uses a symbolic variable (100) (for example Tank1, Tank2) and a structured type object representing this variable, for each program variable. Consequently, programming is independent of the physical location of the automation equipment. Similarly, the designer no longer needs to know the manufacturer's language interface for the modules that he uses.

It can be understood that the use of these symbolic variables (100) and structured type objects means that an automation equipment can be programmed before precise knowledge is available about the topological address of the different modules that it contains or the configuration of input-output modules. Similarly, it can be understood that the same programming can advantageously be applied to several items of automation equipment provided that these items of automation equipment perform the same business functions and provided that the input-output modules of items of automation equipment support the same structured type objects.

Similarly, the symbolic variables (100) are typed, and consequently can be used as parameters of a function block.

If the program written with structured symbolic variables (100) is to be able to operate on an automation equipment, it is necessary firstly to perform a configuration step on the symbolic input-output variables, and secondly to perform a program compilation step (50) to obtain an executable application program (30) that can be executed by the central processing unit of the automation equipment.

The step to configure symbolic input-output variables consists of defining the location of each module in the automation equipment. The designer does this by simply providing the position of each input-output module, from which at least one item of information is used in the application program. For example, this configuration may be grouped in a fifth table No. 5 (5, FIG. 1) called the configuration table, stored in the memory of the programming station, of which a first column contains the name of the input-output variables used in the program and a second column contains:

the slot (rack No.) in the automation equipment, of the input-output module corresponding to the input-output variables, by defining the rack number, the slot number in the rack, and the channel number (channel No.) in the slot.

The configuration table No. 5 given below contains a configuration example.

| Variable name | Rack No. | Slot No. | Channel No. |
|---|---|---|---|
| Tank1 | 1 | 2 | 3 |
| Tank2 | 1 | 3 | 1 |

When the configuration of symbolic input-output variables is complete, the automation application designer chooses an input-output module with a specific commercial reference for each symbolic input-output variable. This step is commonly called the input-output modules configuration step. The configuration of the input-output modules also comprises the assignment of the chosen module to a physical location in a rack, in a known manner. This assignment must comply with the configuration of the structured type object made previously such that the slot chosen for the structured type object corresponds to the slot for the chosen input-output module channel.

Thus, the slot of the input-output module with a given commercial reference must correspond to the location of an associated structured type object compatible with the input-output module.

When the designer has completed configuration table No. 5, for example by using the interaction means of the programming station, the designer starts an interpretation step (40) on the programming station to generate the complete topological address of each symbolic variable (100) used by the program designer, in order to transform the application program (10) written using input-output variables in symbolic form into an interpreted application program (20) that can be compiled so that it can be executed on the automation equipment considered.

In order to do this, the programming station comprises interpretation means that can access memory means containing table No. 1 (1.1, 1.2) of elements of a structured type object, the instantiation table No. 4 (4, FIG. 1), and the configuration table No. 5 (5, FIG. 1). The interpretation means comprise means of analysing the application program (10) written with symbolic input-output variables (100). As explained above, a variable (100) comprises essentially two fields (101, 102). A first field (101) indicates the identity of the manipulated symbolic variable (100). The second field (102) identifies the element of the structured type object corresponding to this variable.

Consequently, the analysis means initially detect the structure of the symbolic variable (100). The analysis means then firstly determine the IODDT or the structured type object associated with the variable, by comparing the character string in the first field (101) of this variable with all variable names in the instantiation table No. 4 (4), in a first step (31). When a match is found, the analysis means extract the structured type identifier associated with the input-output variable from the instantiation table No. 4, and temporarily store it in the memory means. Secondly, the analysis means determine the location of the module associated with this variable by performing a second step (32) to compare the character string in the first field (101) of this variable with all variable names in the configuration table No. 5 (5). When a match is found, the analysis means carry out a third step (33) to extract the rack number, the slot number in this rack and the channel number in this slot from the configuration table No. 5, and temporarily store this number in the memory means.

The analysis means then determine the exact address of the input-output object corresponding to the input-output variable. In order to do this, the analysis means perform a fourth step (34) in which they compare the second field (102) of the input-output variable with the names of the structured type elements in table No. 1 (1.1) corresponding to the structured type extracted and stored after analysing the first field (101) in the input-output variable. When a match is found in table No. 1 the analysis means carry out a fifth step (35) to extract the relative address and extend it with the slot number of the extracted and stored module, after analysing the first field (101) in the symbolic input-output variable (100). The complete topological address (200) thus recreated by the analysis means is then substituted for the symbolic input-output variable (100) in the application program (10). When the entire application program has thus been modified by the analysis means of the programming station, all structured symbolic variables (100) are replaced by the exact topological address (200) on the automation equipment of the corresponding input-output object.

The interpreted application program (20) can then be compiled (50) to be transformed into an automation application program (30) that can be executed on the automation equipment considered.

During compilation, in other words during generation of the automation application program executable on the automation equipment, an additional check step must be carried out in order to check that the corresponding channel on the input-output module declared by the designer corresponding to each slot in a structured type object enables the use of the structured type object associated with this slot. Thus, in our example, if the designer had declared the "Tank1" variable corresponding to the "T_ANA_IN_STD" structured type on channel 3 of slot 2 of module rack 1, then the commercial reference of the declared input-output module configured by the designer in slot No. 2 of rack 1 must be the reference of the analogue input module for which channel 3 supports the T_ANA_IN_STD" structured type object.

To achieve this, the check step consists of applying the verification means of the programming station to verify, for each topological address, that the structured type object of the symbolic variable corresponding to the topological address belongs to the list of structured type objects supported by the chosen input-output module configured at the same topological address. The list of structured type objects supported by a chosen input-output module is stored on the programming station, for example in the form of a catalogue in a file.

Thus, in our example, the verification means scan the list of structured type objects supported by the chosen input-output module to make the "Tank1" variable, to search if the list of structured type objects in slot 2 of rack 1, channel 3 of the module contains the "T_ANA_IN_STD" structured type object.

After this verification step, the executable application program is transferred from the programming station to the automation equipment on which it is to operate. This transfer may be done using portable memory means adapted to the automation equipment on which the programming station stored the executable application program. In another variant embodiment, the executable application program is transferred to the memory means of the automation equipment through a communication link between the automation equipment and the programming station.

Figure 3:
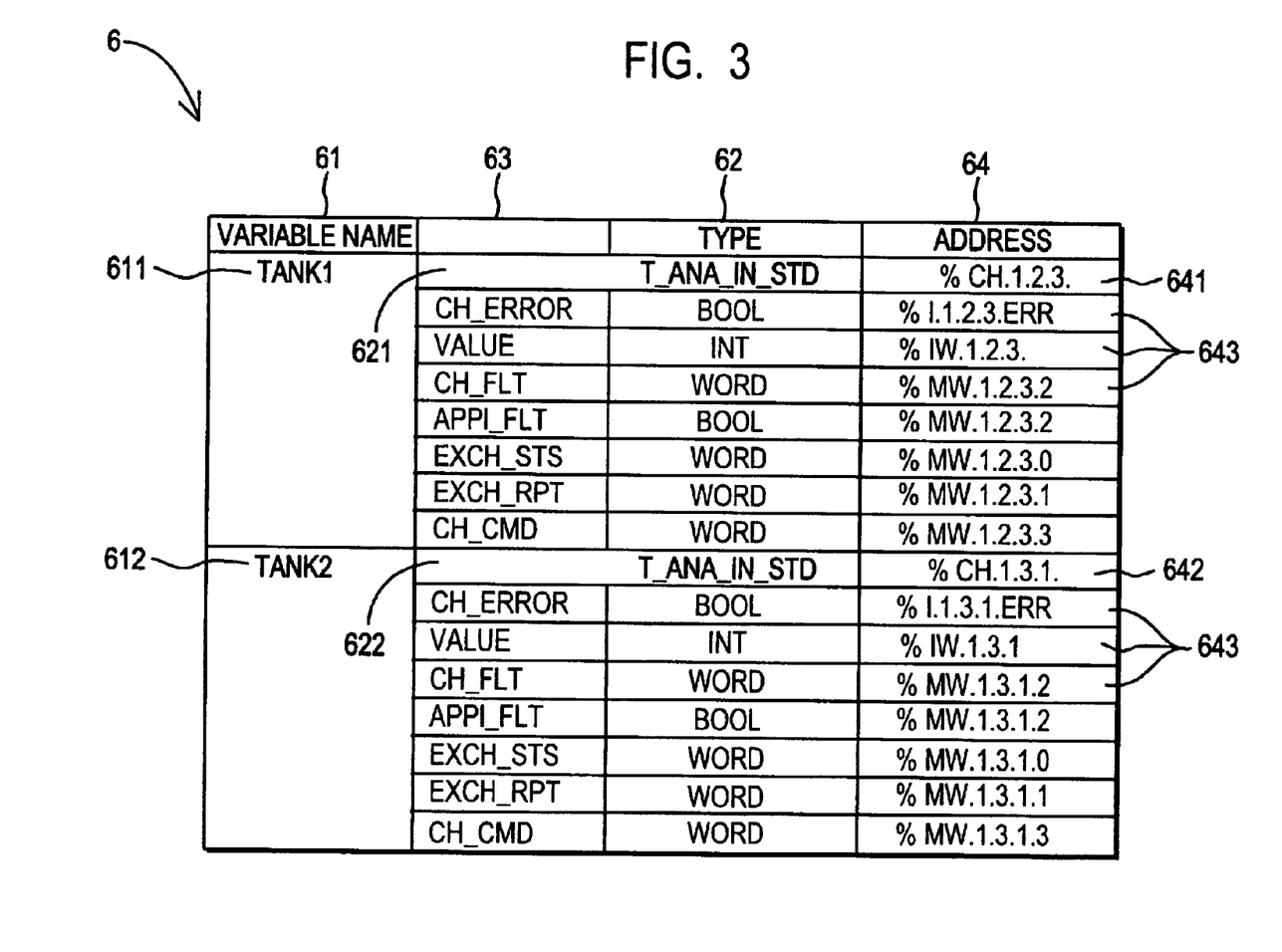
FIG. 3 represents an example of a graphic interface of a variables editor.

FIG. 3 shows an example of a graphic editor for program input-output variables. According to one variant embodiment, the graphic editor includes a screen (6) comprising a plurality of display areas and input areas organized as a table. Note also that all fields are blank at the beginning of the declaration of the input-output variables for the program, except for a plurality of areas on the first row of the table (6). A first column (61) is an input column that the designer uses to input and memorize the name of each variable that he would like to use. The operator input the name "Tank1" of a first symbolic variable (100) in a first cell (611) in the first column, and he inputs the name "Tank2" of a second symbolic variable (100) in a second cell (612) in the first column (61). For each variable input, the designer chooses the structured type object that he would like to assign to the table, in a second column (622) in the table (6). In order to achieve this, if the designer knows the exact name of the structured type object, he will input it into the input area (621, 622) in the second column (62) associated with the corresponding cell (611, 612). In another variant, a popup menu (not shown) may appear when the designer points a cursor to the input area (621, 622) in the second column (62) associated with the corresponding cell (611, 612). The popup menu then contains the list of all available IODDTs. Selection and then validation of an IODDT in the list makes the popup menu close and the name of the IODDT chosen in the input area (621, 622) of the second column (62) associated with the corresponding cell (611, 612) is displayed. All names of elements of the chosen IODDT and the type of each element can also be displayed in a third column (63) and in the second column (62), during this operation. This display is done by extracting elements corresponding to the IODDT object chosen by the user, from table No. 1 (1.1, FIG. 1) of elements of a corresponding structured type object. The designer then repeats the operation for each variable that he declared.

As explained previously, at the end of this declaration step, the designer can write the program using the symbolic variable (100) that he declared.

The step to configure the symbolic input-output variables described above consists of defining the fourth column (64) displayed by the editor with the physical location of each module corresponding to the chosen symbolic variable (100). The designer does this by inputting the exact slot of the channel supporting the symbolic variable (100) in each cell (641, 642) of the fourth column (64) corresponding to each cell (611, 612) in the first column (61) containing the name of a symbolic variable (100). The information input into cells (641, 642) in the fourth column corresponds to the information in the configuration table No. 5 (5, FIG. 1). As soon as the designer validates input of the exact location of the channel supporting the symbolic variable (100), a module of the graphic interface determines the complete topological address for each element of the structured type object, and displays it in the cells (643) of the fourth column corresponding to each element of the structured type object. The topological address is determined by taking the relative address of the element of the structured type object stored in table No. 1 of elements of a structured type object corresponding to the associated structured type object, and adding the exact location of the channel input in the corresponding cells in the fourth column (64).

Once completed, the interpretation means can use the graphic interface table (6) to replace each programmed symbolic variable (100) by its complete topological address as described above, in the program (10).

Obviously, those skilled in the art will realise that there are many other specific embodiments of this invention without going outside the scope of the invention, as claimed. Consequently, these embodiments must be considered for illustration purposes, and can be modified within the scope defined by the application of the appended claims, and the invention must not be limited to the details given above.

What is claimed is:

1. A method for programming an automation application program on an automation equipment programming station, the method comprising:

generating definitions of each of a plurality of structured each representing an input-output channel of an input-output module an automation equipment, the definition of each structured object comprising at least one characteristic element corresponding to input-output information exchanged between the input-output module and the application program, and a relative topological address of the input-output information for each said element;

declaring symbolic input-output variables of the application program as an instance of a previously defined structured type object;

configuring symbolic input-output variables of the application program comprising a definition of a physical location of each input-output module of such automation equipment associated with the symbolic input-output variables; and automatically interpreting the application program or execution on such automation equipment, comprising replacing said symbolic input-output variables with a complete topological address of said corresponding input-output information.

2. The programming method according to claim 1, wherein each said symbolic variable of the application program comprises two fields, a first field comprising a character string chosen by an application program designer, wherein the method further comprises making a structured object correspond to the symbolic variable, and a second field comprising identification of an element of the structured object associated with the symbolic variable.

3. The programming method according to claim 1, wherein said replacing said symbolic input-output variables comprises:

searching for the relative address defined for each structured element in a table of elements of a structured object stored on a programming station;

searching in a configuration table for said defined physical location declared for each module associated with symbolic input-output variables of the application program; and constructing an exact topological address of each symbolic variable of the application program, using a means for interpretation of an application program on the programming station, starting from the relative address and the physical location definition found by said searching in a configuration table.

4. The programming method according to claim 1, wherein said generating definitions of each of a plurality of structured objects comprises creating a table of structured object elements comprising a first column comprising at least one identification of characteristic data of the structured object, a second column comprising an elementary data type (EDT) and a third column comprising the relative address of the data of the structured object, and then storing said table in portable memory, for each structured object.

5. The programming method according to claim 3, wherein the table of structured object elements comprises a fourth column comprising a description of the data of the structured object, and a fifth column comprising read or write rights for each said data of the structured object.

6. The programming method according to claim 1, further comprising configuring input-output modules comprising selecting a commercial reference of an input-output module, and assigning an input-output module associated with the selected commercial reference to a determined physical location, said interpreting then comprising checking that the input-output module selected at a determined physical location is compatible with the structured object configured at the same determined physical location.

7. A programming station for programming automation equipment, comprising:

memory means for storing and displaying data; and means for interaction with a designer of an automation application program;

an editor of symbolic variables for generating a configuration table stored in the memory means;

a plurality of tables of structured object elements stored in the memory means; and means for interpreting an application program comprising at least one symbolic variable defined by an application designer using said editor.

8. The programming station according to claim 7, further comprising means for compiling an application program interpreted by said interpretation means to transform the interpreted application program into an executable automation application for execution on an automation equipment.

9. The programming station according to claim 8, further comprising means for transferring the executable automation application onto either portable memory means compatible with such automation equipment, or directly onto the memory means of such automation equipment.

* * * * *